W. H. COLDWELL.
LAWN MOWER.
APPLICATION FILED JUNE 15, 1916.

1,279,267.

Patented Sept. 17, 1918.
4 SHEETS—SHEET 3.

INVENTOR
William H. Coldwell
BY
Whitaker Prevost
ATTORNEYS

UNITED STATES PATENT OFFICE.

WILLIAM H. COLDWELL, OF NEWBURGH, NEW YORK.

LAWN-MOWER.

1,279,267.

Specification of Letters Patent.  Patented Sept. 17, 1918.

Application filed June 15, 1916. Serial No. 103,754.

*To all whom it may concern:*

Be it known that I, WILLIAM H. COLDWELL, a citizen of the United States, residing at Newburgh, in the county of Orange and State of New York, have invented certain new and useful Improvements in Lawn-Mowers; and I do hereby declare the following to be a full, clear, and exact description of the invention, such as will enable others skilled in the art to which it appertains to make and use the same.

My invention consists in the novel features hereinafter described reference being had to the accompanying drawings, which illustrate one embodiment of my invention selected by me for purposes of illustration, and the said invention is fully disclosed in the following description and claims:

Referring to the said drawings.

One of the objects of my invention is to provide a lawn mower which can be used either singly as a hand, horse or motor propelled mower, or which may be employed without any material variation as one of the units of a multiple unit mower, such, for example, as is disclosed in my former application above referred to, thus effecting economy in the construction of this class of machine. As the mower units can be manufactured in quantity and may be equipped with means for propelling them by hand or horse power, or in connection with a motor propelled apparatus, or a number of said units may be conveniently assembled in connection with a suitable connecting frame such, for example, as is shown and described in my former application.

Another object of my invention is to provide a lawn mower in which the cutting mechanism is movable vertically into and out of operative relation with the ground, with means by which the rotary cutter is automatically thrown out of operation before the cutting mechanism is raised out of operation with the ground, and the preferred form of my invention contemplates lifting means for raising the cutting mechanism into inoperative position, which lifting means is operatively connected with means for throwing the rotary cutter out of operative relation with its driving mechanism before said lifting means becomes operative to lift the cutting mechanism.

My invention also contemplates the provision of means for connecting the main frame of the mower with the portion of the frame carrying the cutting mechanism by a pivotal connection permitting the cutting mechanism to be raised and lowered and to locate the axis of the said pivotal connection in rear of the axes of the main supporting wheels or rotary supports of the mower so that the weight of the supported frame and of any superposed frame or device shall be exerted on the cutter carrying portion of the mower frame in rear of the axes of the ground wheels so that such weight shall be added to the weight of the cutting mechanism and adjacent portions of the frame, and assist in holding the cutting mechanism in close relation to the ground when in operation so as to prevent it from vertical vibration in passing over uneven ground.

Figure 5:
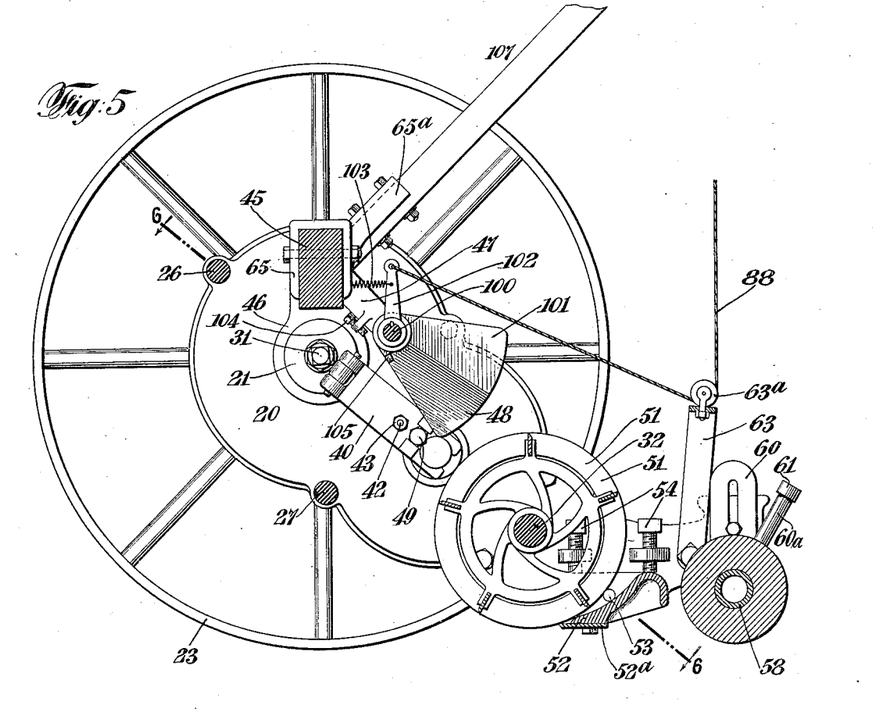
Fig. 5 is an enlarged longitudinal sectional view of the machine with the handle broken away.

My invention also contemplates certain details of construction hereinafter fully described, and the entire invention is fully set forth in the following description and claims. In the lawn mower selected by me for purposes of illustrating the invention and shown in the accompanying drawings, 20—20 represent parallel side frames, each of which is provided on its inner face with an enlarged friction hub, 21, see Figs. 5 and 6, the hubs being in axial alinement transversely of the machine or unit, and each of said side frames is provided with a stub axle, 22, which is secured to one of the ground wheels, 23, which wheels support the forward portions of the side frames together with the main frame of the mower and any superstructure carried thereby, and also preferably serve to drive the rotary cutter.

Figure 6:
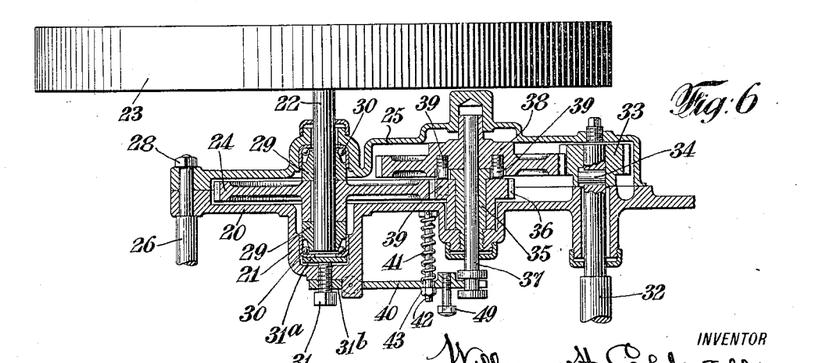
Fig. 6 is a sectional view on line 6—6 of Fig. 5.

Each of the said axles is provided with a driving gear, 24, for transmitting power to drive the rotary cutter, and the said frames are provided with suitable bearings for the said axle, for the shaft of the rotary cutter, and for the intermediate gearing, in any suitable manner. I prefer to provide each of the side frames with an exterior gear casing, 25, forming part thereof, and secured rigidly thereto, but said side frames may be formed in other ways. In the present instance, I have shown the side frames of each unit rigidly connected by transverse tie-rods, 26—27, which are preferably shouldered as indicated in Fig. 6, the reduced portions being passed through suitable apertures in the side frames and casings and provided with nuts, 28, which serve to hold the gear casings and side frames together, and also to connect the two side frames of the mower unit. The gear wheel, 24, is preferably splined or keyed on the stub axle, 22, and the stub axle is provided with bearing cones, 29—29, engaging balls carried in cups, 30, which are supported in recesses in the friction hub, 21, of the side frame and a corresponding portion of the gear case, and I provide a set screw, 31, extending, in this instance, through the end of the hub, 21, and engaging a plate, 31ª, in contact with the inner cup, 30, which is capable of sliding longitudinally of the axle.

It will be seen that this one set screw will accurately adjust the entire bearing for each stub axle including both cones and both cups, and the set screw is provided preferably with a jam nut, 31ᵇ for locking it in adjusted position. 32 represents the shaft of the rotary cutter, the end portions of which are mounted in bearings in the side frames and are each provided with a pinion, 33, connected thereto by an overrunning clutch construction in a well known way. For example, the interior of the pinion or of the hub thereof may be provided with a series of ratchet teeth and the shaft may be provided with a sliding pawl, 34, lying in a transverse recess in the shaft as indicated in Fig. 6. Between the stub axle and the cutter shaft each side frame is provided with a shouldered bearing sleeve, 35, supporting an intermediate pinion, 36, meshing with the driving gear, 24, on the stub axle. A gear shift rod, 37, extends through the bearing sleeve, 35, and is provided with a shiftable gear, 38, pinned or otherwise rigidly secured to the shift rod, 37, and meshing with the pinion, 33, on the cutter shaft, which latter is provided with a wider face than the gear, 38.

The pinion, 36, and gear, 38, are thus coaxial and are provided with inter-engaging clutch members comprising, in this instance, studs, 39, on their proximate faces so that when the gear, 38, is in its innermost position adjacent to the pinion, 36, the clutch studs of one will engage the clutch studs of the other and cause the rotation of the rotary cutter by the forward rotation of the ground wheel, 23. It will thus be seen that by pushing the shifting rod, 37, outwardly the gear, 38, will be moved bodily so as to disengage the clutch members of the gear, 38, and pinion, 36, while retaining its engagement with the pinion, 33.

I provide means for disconnecting the driving mechanism which may be operated from a distance, and I prefer to combine this mechanism with the means for lifting the rear portion of the side frames vertically to raise the cutting mechanism out of operative relation with the ground, in such manner that the driving mechanism for the rotary cutter will be positively thrown out of operation before the cutting mechanism is raised. In this instance, the inner end of the gear shifting rod, 37, is provided with an annular grooved portion which is engaged by a yoke on one end of a gear shifting lever, 40, pivoted, in this instance, to a lug projecting inwardly from the friction hub, 21, or other suitable portion of the side frame. The shifting lever, 40, is provided with an actuating spring, 41, which, in this instance, is coiled around a retaining rod, 42, having one end attached to the adjacent side frame and the other end extending through an aperture in the shifting lever and provided with an adjusting nut, 43, so that the spring, 41, normally holds the shifting rod, 37, and gear, 38, in their innermost positions, and thus connects the pinion, 33, at each end of the rotary cutter shaft with the corresponding driving gear, 24.

Figures 1, 2, 10, 11:
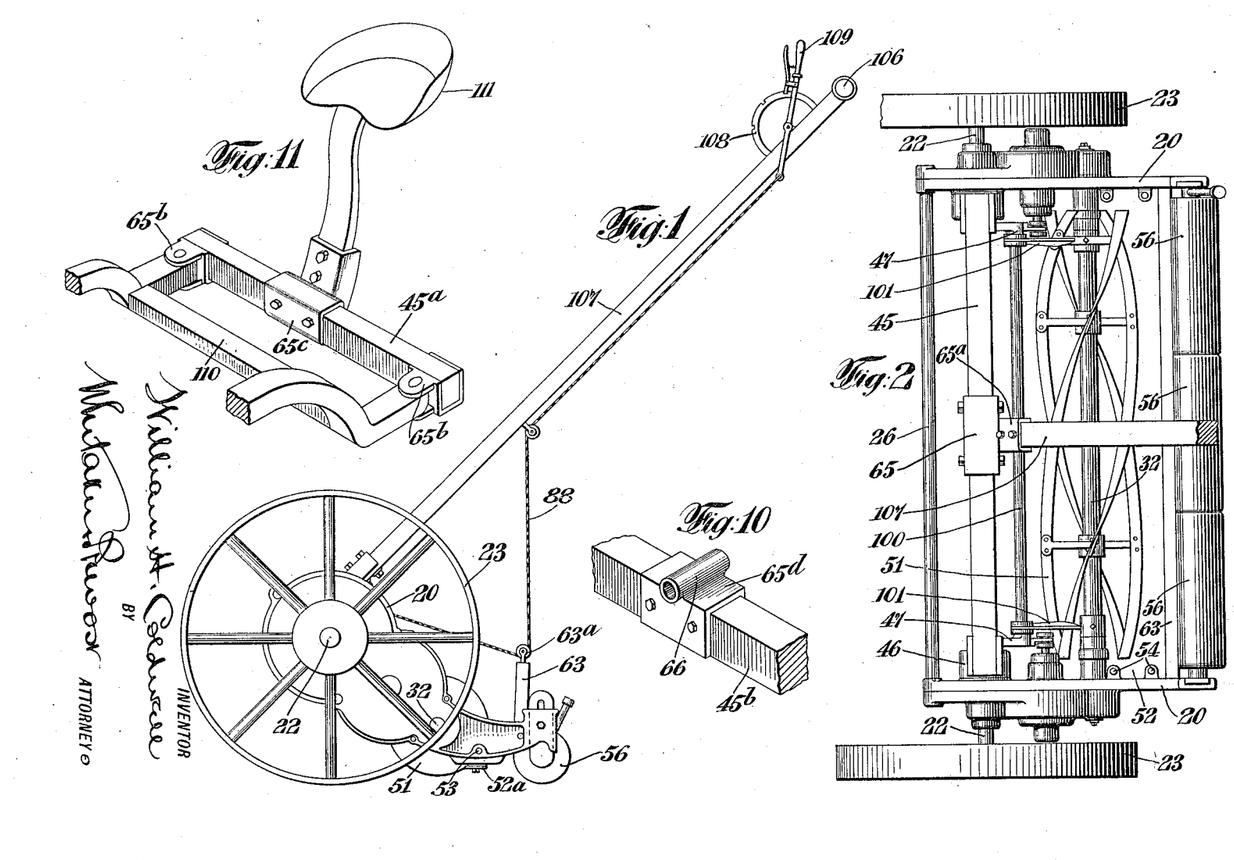
Figure 1 represents a side elevation of a lawn mower embodying my invention, and selected by me for the purpose of illustrating the same.
Fig. 2 is a top plan view of the machine shown in Fig. 1 with the handle broken away.
Fig. 10 is a detail perspective view showing a form of saddle for engaging the supporting frame bar which may be advantageously employed when the machine herein illustrated and described is used as one of the units of a multiple unit machine, such as that described and claimed in my former application for Letters Patent of the United States, filed March 29th 1916, and given Serial #87,444.
Fig. 11 is a detail perspective view illustrating one arrangement for equipping my improved mower unit with a draft apparatus and a driver's seat when it is used as a horse propelled mower.
Figure 3:
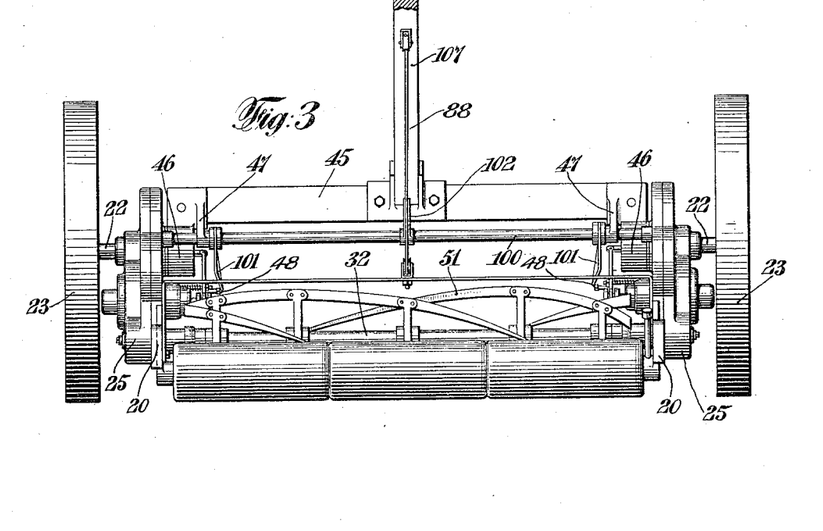
Fig. 3 is a rear elevation of the machine with the handle broken away.
Figure 4:
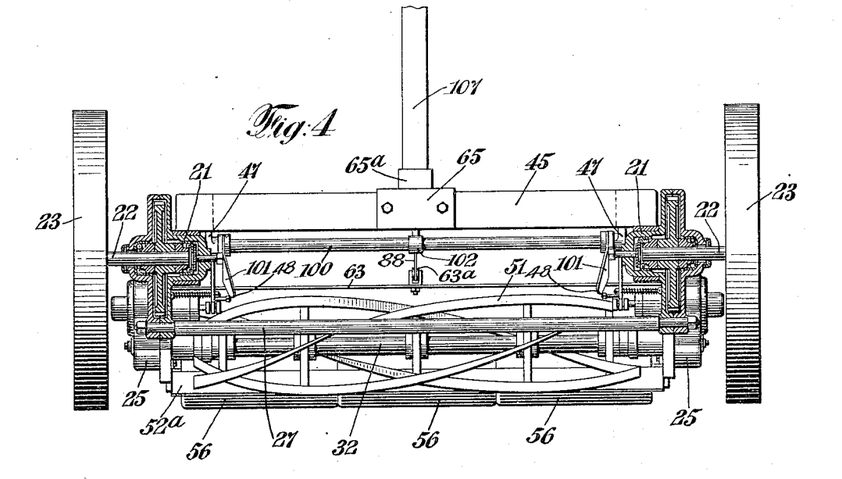
Fig. 4 is a front elevation of the machine with the handle broken away and portions at each side of the machine shown in section.

What I may term the main frame or supporting frame of the mower, as distinguished from the side frames carrying the cutting mechanism, constitutes, in this instance, a transversely disposed bar, 45, which is preferably made of wood, and is provided at each end with a friction bearing sleeve engaging the friction hub, 21, of the adjacent side frame, with a tight frictional engagement. Where the machine is used singly this main frame has attached to it the propelling mechanism which may be a handle, as shown in some of the figures in the drawing, or which might be the shafts or tongue where the machine is to be drawn by horses, as indicated in Fig. 11, and in case the machine is used as one of the units of a multiple machine, such as illustrated in my former application, the connecting frame of the apparatus will be pivotally secured to and supported upon this main frame, as indicated in Fig. 10, for example, and as shown in my former application so as to allow the unit to rock transversely independently of the superposed connecting frame. In any case the weight of this main frame and connected parts is carried by the pivotal connections, 21 and 46, with the side frames of the mower unit and the weight thereof and of any superposed structure or weight is carried by the ground wheels and the stub axles thereof.

I prefer to make the hubs, 21 and sleeves, 46, of considerable diameter so that the friction thereof will tend to prevent the rear end of the side frames carrying the cutting mechanism from jumping up and down in passing over rough ground. Upon some suitable portion of the machine, in this instance, on the cross bar, 45, I provide means for actuating the shifting rods, 37, so as to disengage the driving mechanism for the rotary cutter. In this instance, I have shown at each end of the cross bar a bracket, 47, which is conveniently formed integrally with the bearing sleeve casting and bolted or otherwise secured to the cross bar. The rock shaft, 100, extends across the machine and has its ends mounted in said brackets, 47, and upon this shaft are mounted plates, 101, provided with inclined cam portions, 48, adapted to engage a part connected with the shifting lever, 40, when the plates, 101, are moved downwardly by the movement of the rock shaft so as to move the shifting levers and shifting rods outwardly and disconnect the rotary cutter.

In this instance, the shifting levers, 40, are each provided with an adjustable stop or screw, 49, adapted to be engaged by the cam portions, 48, of the plates for the purpose mentioned. The rock shaft, 100, may be operated in any desired manner. In this instance, it is shown as provided with an actuating arm, 102, and the rock shaft is held normally, as by a spring, 103, in such position that the cam portions, 48, of the plates, 101, are entirely out of operative relation with the stops, 49, on the shifting levers.

I also prefer to provide a stop for the rock shaft, which, in this instance, comprises an adjustable screw, 104, located on the bracket, 47, and adapted to engage a lug, 105, on a part connected with the rock shaft as the plate, 101, so as to stop the rock shaft when the gears, 38, are thrown out of operative relation. This stop is really unnecessary as the gear, 38, can only be moved outwardly a limited distance and will then be arrested either by the gear casing or by the grooved collar on the shifting rod, 37, striking the inner end of the boss on the side frame, but obviously any form of stop, which will limit the movement of the rock shaft, may be employed.

Suitable connections extend from the rock shaft, or the actuating arm, 102, to a point convenient for the operator as, in this instance, a flexible cord or chain, 88, so that the operator can operate the rock shaft and disconnect the rotary cutter when desired. As before stated, I prefer to arrange the mechanism for throwing the rotary cutter out of gear in conjunction with the means for raising the cutting mechanism out of operative relation with the ground, and in the drawings, I have shown the rear end of the side frames provided with a bail, 63, carrying the roller or pulley, 63$^a$, and I have shown the flexible connection, 88, passing beneath the pulley, 63$^a$, and thence to a point adjacent to the hand engaging portion, 106, of the handle bar, 107, for example, where the machine is to be propelled by hand so that the operator by pulling on the flexible connection, 88, will first actuate the rock shaft, as before described, and throw out of operation the rotary cutter. As soon as this movement stops, a further pull on the flexible connection, 88, will elevate the rear portion of the side frame carrying the cutting mechanism and raise it out of operative relation with the ground, and it may be held or secured in such a position by any desired means. For example, in Fig. 1, I have shown the handle bar, 107, provided with a segment, 108, and operating lever, 109, the latter having a movable pawl to engage the locking notches in the segment, 108, locking the lever in a plurality of positions, as for example, in one position after rocking the rock shaft to disengage the clutch mechanism, and in another position after raising the rear ends of the side frames. Obviously the operating lever for the flexible connection, 88, can be located at any convenient point according as the apparatus is used, as a hand propelled, horse propelled, or motor propelled device, or in association with other units in a multiple mower.

Figure 9:
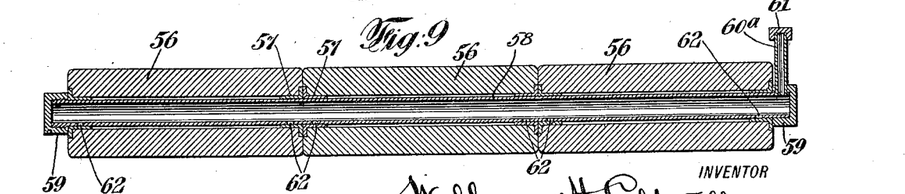
Fig. 9 is a detail sectional view of the rear ground engaging roller of the machine illustrating means for securing it in position and lubricating it.

51 represents the rotary cutter of usual or any preferred construction carried by the cutter shaft, 32, and 52 represents the stationary knife bar pivotally mounted at 53 in the side frames at each end of the bar and provided with adjusting screws, 54, in the usual manner for rocking it upon its pivots to bring the stationary knife, 52ª, into proper adjusted relation with the knives or blades of the rotary cutter. The rear ends of the side frames are supported, as usual, by a ground roller, which is preferably formed, as shown in Fig. 9, in a plurality of parts, 56, each of which is provided with bushings, 57, at each end, driven into the ends of the roller sections which are preferably of wood, the said bushings engaging a hollow shaft, 58, the ends of which are screwed into hangers, 59, which close the ends of the hollow shaft and are provided with vertically disposed slotted portions, 60, adjustably secured to the side frames. At one or both ends of the hollow shaft, 58, I drill a hole through the hanger, 59, and the hollow shaft, 58, and insert a vertically disposed pipe, 60ª, provided with a removable cap or closure. This pipe, 60ª, prevents the rotation of the shaft, 58, in the hangers, thus preventing its disengagement therefrom, and through said pipe a liquid or semi-liquid lubricant may be introduced so as to fill the hollow shaft, 58, the latter being provided on its lower side adjacent to each of the bushings, 57, with an aperture, 62, so that the lubricant is supplied to the bearings of the sectional roller, and, as a matter of fact, the hollow shaft will contain a sufficient amount of lubricant for almost, if not quite, an entire season.

Where the mower is to be used as a hand operated mower I conveniently attach the handle bar, 107, to the cross bar, 45, for example, by providing the cross bar with a saddle, 65, bolted or otherwise secured thereto, and having an arm or socket, 65ª, adapted to be secured to the handle bar. Where the device is to be used as a horse drawn machine, the draft apparatus, which may be a pair of shafts, for example, is conveniently secured to the cross bar, as indicated in Fig. 11, in which the cross bar is shown at 45ª. In such case I may conveniently provide the cross bar with a pair of saddles, 65ᵇ, to which the draft apparatus indicated at 110 is secured, preferably, by a rigid connection in order that the draft apparatus and the cross bar shall remain in fixed relation with each other, and in such case the cross bar may be also provided with a saddle, 65ᶜ, carrying the driver's seat indicated at 111, if desired. Where the device is propelled in advance of a motor driven vehicle or apparatus, the push bars or links connecting it with the motor vehicle may be secured to the cross bar, 45, in any desired way, as by forming said links integrally at their forward end with saddles embracing and secured to cross bars, 45.

Where the mower herein shown is to be used as a unit in a multiple mower, such as is shown in my former application, the cross bar may be provided, as shown in Fig. 10 at 45ᵇ, with a saddle, 65ᵈ, secured thereto and provided with a pivotal sleeve, 66, adapted to be pivotally connected with the connecting frame, in the manner shown in my former application. It will thus be seen that the mower herein illustrated and described can be used as a single unit, as a hand mower, as a horse or motor propelled mower, or as one of the units of a multiple mower without any structural change.

Figures 7, 8:
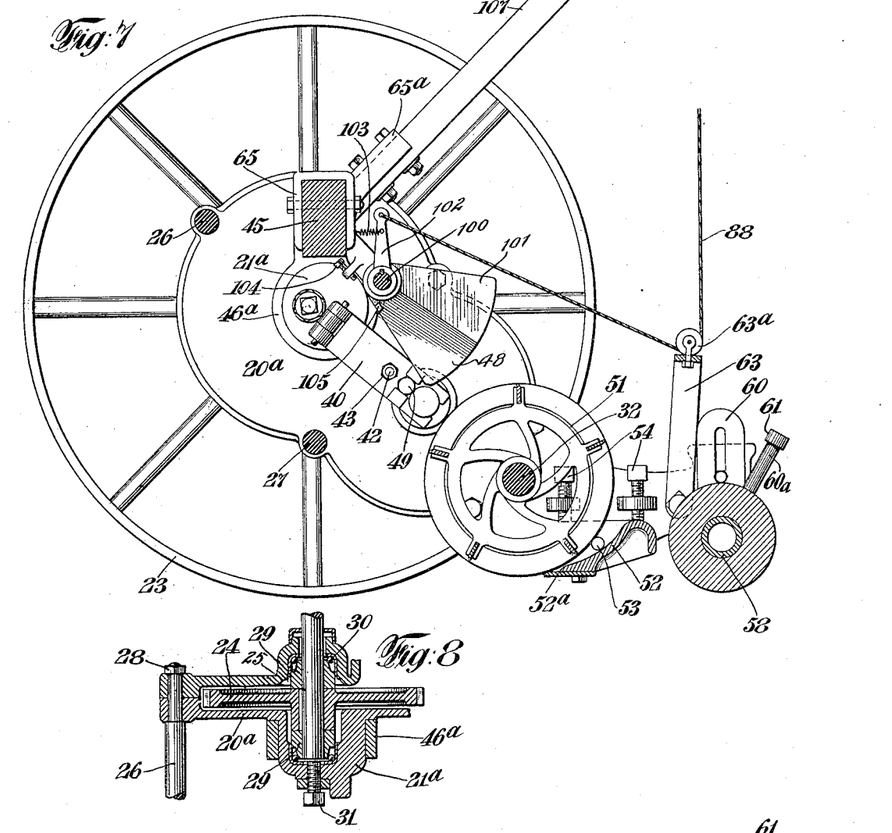
Fig. 7 is a view similar to Fig. 5 illustrating a slight modification of my invention in which the center of gravity of the supporting frame is located in rear of the axis of rotation of the main rotary supports of the machine so as to exert the downward pressure upon the side frames carrying the cutting mechanism.
Fig. 8 is a detail sectional view illustrating the pivotal connection between the supporting frame and the side frames of the mower.

In order to still further prevent the vertical jumping of the rear end of the mower in passing over uneven ground, I find it advantageous, in some cases, to throw the weight of the main frame and parts supported thereby to the rear of the axis of the ground wheels, and in Figs. 7 and 8 I have illustrated as a modification of my invention a construction by which this can be advantageously carried out.

All of the parts of the machine except those hereinafter specified may be and are shown as being identical with the parts heretofore described and are given the same reference numerals in these figures. In this case the friction hubs, here indicated at, 21ª, are so formed on the inner faces of the side frames, 20ª, that their centers are in rear of the axes of rotation of the stub axles and ground wheels as clearly shown in Figs. 7 and 8. These eccentric hubs, 21ª, are embraced by the sleeves, 46ª, secured to the cross bar, 45, at each end so that the weight of the cross bar, its connected parts and parts supported thereby is applied to the hubs, 21ª, in a line in rear of the axes of rotation of the ground wheels. It follows from this construction that the weight of the main frame and superimposed weight carried thereby has a tendency to depress the rear end of the side frame carrying the cutting mechanism and further assist the frictional engagement of the sleeves, 46ª, with the hubs, 21ª, which are fitted tightly, in preventing the bobbing of the cutting mechanism, as in order to raise the cutting mechanism, it is necessary to slightly elevate the cross bar, 45, and connected parts through the partial rotation of the eccentric hubs, 21ª, as will be readily seen in Figs. 6 and 7.

I have, therefore, in this construction, a plurality of forces tending to hold the cutting mechanism in proper relation with the ground, to wit, the weight of the cutting mechanism and the rear ends of the side frames, the frictional engagement between the hubs, 21ª, and the sleeves, 46ª, and the weight of the main frame and connected parts and any weight supported thereby. In both forms of my invention, it will be noted that the weight of the main frame and the weight supported thereby is borne by non-rotary parts, to wit, the hubs, 21ª, so that the wear of these parts is reduced to a minimum while their pivotal character permits the raising of the cutting mechanism with respect to the main frame by swinging the rear ends of the side frames around their pivotal connection with the ground wheels and with the main frame.

As hereinbefore described the mechanism for throwing the rotary cutter out of gear is certainly operated before the mower is raised from the ground, and this is an important feature of my invention. By this means, the rotation of the rotary cutter will be actually stopped or at least the rotary cutter will be disconnected from its driving mechanism before it is raised to pass over an obstacle or for other purposes, and hence if the rotary cutter should strike such an obstacle the rotary cutter will not be injured as is frequently the case where the rotary cutter is lifted while still connected with the driving mechanism. By my improved construction, I can also disconnect the driving mechanism without lifting the cutting mechanism from the ground, if desired or found convenient.

(The specific construction of the wheel mounting herein shown and described is not claimed herein, as it forms the subject matter of another application for patent filed by me Sept. 21, 1916, Serial No. 121,367. The specific construction of the rear roller and its supporting and lubricating mechanism is also not claimed herein, as it forms the subject matter of another application for patent filed by me September 21, 1916, Serial No. 121,368.)

What I claim and desire to secure by Letters Patent is:

1. In a lawn mower, the combination with a horizontal transversely disposed supporting member and means connected therewith for propelling the mower over the ground, of a mower frame, rotary ground engaging devices for supporting the mower frame, axles for said rotary ground engaging devices, cutting mechanism carried by the mower frame including a rotary cutter, operative connections from a ground engaging device to said rotary cutter and pivotal connections between said horizontal supporting member and the mower frame independent of the axles of any of said rotary ground engaging devices.

2. In a lawn mower, the combination with a transversely disposed supporting member, of a mower frame provided with ground wheels, cutting mechanism connected to the mower frame including a rotary cutter located at a distance from the axes of said ground wheels and auxiliary rotary ground engaging devices connected to said frame adjacent to the rotary cutter, pivotal connections between said supporting member and the mower frame comprising closely enengaged non-rotary parts in frictional engagement with each other and having their pivotal axes adjacent to the axes of the ground wheels, whereby the frictional engagement of the parts of said pivotal connections will assist in preventing the accidental elevation of the cutting mechanism with respect to the ground, and driving connections from a ground wheel to the rotary cutter.

3. In a lawn mower, the combination with a transversely disposed supporting member, of a mower frame provided with ground wheels, cutting mechanism connected to the mower frame including a rotary cutter located at a distance from the axes of said ground wheels and auxiliary rotary ground engaging devices connected to said frame adjacent to the rotary cutter, said mower frame being provided with non-rotary friction hubs adjacent to the axes of the ground wheels, and said supporting member being provided with sleeves frictionally engaging said hubs and forming pivotal connections between said member and the mower frame, and driving connections from a ground wheel to said rotary cutter.

4. In a lawn mower, the combination with a transversely disposed supporting member, of a mower frame provided with ground wheels, cutting mechanism connected to the mower frame including a rotary cutter located at a distance from the axes of said ground wheels and auxiliary rotary ground engaging devices connected to said frame adjacent to the rotary cutter, pivotal connections between said supporting member and the mower frame having their axes located between the axes of the ground wheels and the rotary cutter, whereby the weight of the supporting member and any weight carried thereby will tend to prevent the accidental elevation of the cutting mechanism, and driving connections from a ground wheel to the rotary cutter.

5. In a lawn mower, the combination with a transversely supporting member, of a mower frame provided with ground wheels, cutting mechanism connected to the mower frame including a rotary cutter located at a distance from the axes of said ground wheels and auxiliary rotary ground engaging devices connected to said frame adjacent to the rotary cutter, pivotal connections between said supporting member and the mower frame comprising non-rotary parts in strong frictional engagement, said pivotal connections having their axes located between the axes of the ground wheels and the rotary cutter whereby any tendency of the rotary cutter to accidentally lift will be opposed by the friction of said pivotal connections and by the weight of the supporting member and any weight carried thereby, and driving connections from a ground wheel to said rotary cutter.

6. In a lawn mower, the combination with a transversely disposed supporting member, of a mower frame provided with ground wheels, cutting mechanism connected to the mower frame including a rotary cutter located at a distance from the axes of said ground wheels and auxiliary rotary ground engaging devices connected to said frame adjacent to the rotary cutter, said mower frame having non-rotary hubs located eccentrically with respect to the axes of the ground wheels and having their axes located between the axes of the ground wheels and the rotary cutter, said supporting member being provided with non-rotary sleeves engaging said hubs and forming pivotal connections between said supporting member and the mower frame, and driving connections from a ground wheel to said rotary cutter.

7. In a lawn mower, the combination with a transversely disposed supporting member, of a mower frame provided with ground wheels, cutting mechanism connected to the mower frame including a rotary cutter located at a distance from the axes of said ground wheels and auxiliary rotary ground engaging devices connected to said frame adjacent to the rotary cutter, said mower frame having non-rotary friction hubs eccentric to the axis of the ground wheels and having their axes located between the axes of the ground wheels and the rotary cutter, said supporting member having hubs frictionally engaging said hubs, and driving connections from a ground wheel to the rotary cutter.

8. In a lawn mower, the combination of a mower frame, ground wheels connected therewith and supporting a portion of said frame, independent rotary ground engaging devices supporting other portions of said frame, cutting mechanism connected to the mower frame adjacent to said independent rotary devices including a rotary cutter, driving connections between a ground wheel and said rotary cutter, clutch mechanism in said driving connections, shifting mechanism for said clutch mechanism, a rock shaft provided with actuating plates having inclined cam faces for actuating the shifting mechanism, and means for rocking said shaft.

9. In a lawn mower, the combination of a mower frame, ground wheels connected therewith and supporting a portion of said frame, independent rotary ground engaging devices supporting other portions of said frame, cutting mechanism connected to the mower frame adjacent to said independent rotary devices including a rotary cutter, driving connections between a ground wheel and said rotary cutter, clutch mechanism in said driving connections, shifting mechanism for said clutch mechanism, actuating means for said shifting mechanism, means for raising the cutting mechanism out of operative relation with the ground, and a connection between said lifting mechanism and said actuating mechanism constructed to cause the operation of said actuating mechanism before the cutting mechanism is raised.

10. In a lawn mower, the combination of a mower frame, ground wheels connected therewith and supporting a portion of said frame, independent rotary ground engaging devices supporting other portions of said frame, cutting mechanism connected to the mower frame adjacent to said independent rotary devices including a rotary cutter, driving connections between a ground wheel and said rotary cutter, clutch mechanism in said driving connections, shifting mechanism for said clutch mechanism, actuating mechanism for said shifting mechanism, means for raising the cutting mechanism out of operation, and a flexible connection between said lifting means and said actuating means having a movable engagement with a part connected to the mower frame adjacent to the rotary cutter for operating the actuating mechanism before the cutting mechanism is raised.

11. In a lawn mower, the combination of a mower frame, ground wheels connected therewith and supporting a portion of said frame, independent rotary ground engaging devices supporting other portions of said frame, cutting mechanism connected to the mower frame adjacent to said independent rotary devices including a rotary cutter, driving connections between a ground wheel and said rotary cutter, clutch mechanism in said driving connections, shifting mechanism for said clutch mechanism, actuating mechanism for the shifting mechanism, a part connected with the mower frame adjacent to the cutting mechanism and provided with a pulley and a flexible connection extending from the actuating mechanism to a point adjacent to the hand of the operator and engaging said pulley for operating the actuating mechanism before the cutting mechanism is raised.

12. In a lawn mower, the combination of a mower frame, ground wheels connected therewith and supporting a portion of said frame, independent rotary ground engaging devices supporting other portions of said frame, cutting mechanism connected to the mower frame adjacent to said independent rotary devices including a rotary cutter, driving connections between a ground wheel and said rotary cutter, clutch mechanism in said driving connections, shifting mechanism for said clutch mechanism, actuating mechanism for said shifting mechanism comprising movable parts provided with inclined cam faces for engaging and actuating the shifting mechanism, and means for operating said mechanism and thereafter elevating the cutting mechanism out of operating relation with the ground.

13. In a lawn mower, the combination with a mower frame comprising connected side frames, wheels connected with said side frames and supporting a portion thereof, cutting mechanism carried by said side frames including a rotary cutter, and independent rotary ground engaging devices supporting said side frames adjacent to the rotary cutter, of a gear member connected with one of the ground wheels, a gear member connected with the rotary cutter, connecting gearing comprising a gear meshing with one of said gear members, and a laterally movable gear meshing with the other of said gear members, said intermediate gears being co-axial, an axial sleeve supporting the non-movable gear, an axially movable shaft extending through said sleeve and supporting the movable gear, interengaging clutch members on the contiguous faces of said gears, and shifting means operatively connected with said axially movable shaft.

14. In a lawn mower, the combination with a mower frame comprising connected side frames, wheels connected with said side frames and supporting a portion thereof, cutting mechanism carried by said side frames including a rotary cutter, and independent rotary ground engaging devices supporting said side frames adjacent to the rotary cutter, of a gear member connected with one of the ground wheels, a gear member connected with the rotary cutter, connecting gearing comprising a gear meshing with one of said gear members, and a laterally movable gear meshing with the other of said gear members, said intermediate gears being co-axial, interengaging clutch members on the contiguous faces of said intermediate gears, an axially movable support secured to one of said gears and shifting mechanism connected with said axially movable support for moving the said movable gear into and out of operative position, and an actuating mechanism movable into and out of engagement with said shifting mechanism.

15. In a lawn mower, the combination with a mower frame comprising connected side frames, wheels connected with said side frames and supporting a portion thereof, cutting mechanism carried by said side frames including a rotary cutter, and independent rotary ground engaging devices supporting said side frames adjacent to the rotary cutter, of a gear member connected with one of the ground wheels, a gear member connected with the rotary cutter, connecting gearing comprising a gear meshing with one of said gear members, and a laterally movable gear meshing with the other of said gear members, said intermediate gears being co-axial, interengaging clutch members on the contiguous faces of said intermediate gears, an axially movable support secured to one of said gears and shifting mechanism connected with said axially movable support for moving the said movable gear into and out of operative position, an actuating mechanism movable into and out of engagement with said shifting mechanism, and means for raising the cutting mechanism out of operative relation with the ground operatively connected with said actuating means.

16. In a lawn mower, the combination with a transversely disposed supporting member, of a mower frame provided with ground wheels, cutting mechanism connected to the mower frame including a rotary cutter located at a distance from the axes of said ground wheels and auxiliary rotary ground engaging means connected to said frame adjacent to the rotary cutter, pivotal connections between said mower frame and said supporting member having their axes adjacent to the axes of the ground wheels, and driving connections between a ground wheel and said rotary cutter.

17. In a lawn mower, the combination with a transversely disposed supporting member, of a mower frame provided with ground wheels, cutting mechanism connected to the mower frame including a rotary cutter located at a distance from the axes of said ground wheels and auxiliary rotary ground engaging means connected to said frame adjacent to the rotary cutter, pivotal connections between said supporting member and said mower frame comprising non-rotary parts independent of the supporting means for the ground wheels, said pivotal connections having their axes adjacent to the axes of the ground wheels and operative connections from a ground wheel to said rotary cutter.

18. In a lawn mower, the combination of a mower frame, ground wheels connected therewith and supporting a portion of said frame, independent rotary ground engaging means supporting other portions of said frame, cutting mechanism connected to the mower frame adjacent to said independent rotary means including a rotary cutter, driving connections between a ground wheel and said rotary cutter, clutch mechanism in said driving connections, shifting mechanism for said clutch mechanism, actuating means for said shifting mechanism adapted to be moved into and out of engagement with the shifting mechanism, and means for operating said actuating mechanism to throw the rotary cutter out of operation while the rotary cutter is in operative relation with the ground.

19. In a lawn mower, the combination of a mower frame, ground wheels connected therewith and supporting a portion of said frame, independent rotary ground engaging means supporting other portions of said frame, cutting mechanism connected to the mower frame adjacent to said independent rotary means including a rotary cutter, driving connections between a ground wheel and said rotary cutter, clutch mechanism in said driving connections, shifting mechanism for said clutch mechanism, pivotally supported actuating means for said shifting mechanism normally held out of operation, and means for moving said actuating mechanism to effect the operation of said shifting mechanism.

20. In a lawn mower, the combination of a mower frame, ground wheels connected therewith and supporting a portion of said frame, independent rotary ground engaging means supporting other portions of said frame, cutting mechanism connected to the mower frame adjacent to said independent rotary means including a rotary cutter, driving connections between a ground wheel and said rotary cutter, clutch mechanism in said driving connections, shifting mechanism for said clutch mechanism, actuating means for said shifting mechanism and means for operating said actuating mechanism and thereafter lifting the cuttting mechanism out of operative relation with the ground.

21. In a lawn mower, the combination with a mower frame comprising connected side frames, wheels connected with said side frames and supporting a portion thereof, cutting mechanism carried by said side frames including a rotary cutter, and independent rotary ground engaging means supporting said side frames adjacent to the rotary cutter of a gear member connected with one of the ground wheels, a gear member connected with the rotary cutter, connecting gearing comprising a gear meshing with one of said gear members, and a laterally movable gear meshing with the other of said gear members, said intermediate gears being co-axial, interengaging clutch members on the contiguous faces of said intermediate gears, an axially movable support secured to one of said gears and shifting mechanism connected with said axially movable support for moving the said movable gear into and out of operative position.

22. In a lawn mower, the combination of a mower frame, ground wheels connected therewith and supporting a portion of said frame, independent rotary ground engaging means supporting other portions of said frame, cutting mechanism connected to the mower frame adjacent to said independent rotary means including a rotary cutter, driving connections between a ground wheel and said rotary cutter, clutch mechanism in said driving connections, shifting mechanism for said clutch mechanism, pivotally supported actuating mechanism for said shifting mechanism including parts provided with cam faces for engaging and moving said shifting mechanism and manually operated means for operating said actuating mechanism.

23. In a lawn mower, the combination with a mower frame comprising connected side frames, wheels connected with said side frames and supporting a portion thereof, cutting mechanism carried by said side frames including a rotary cutter, and independent rotary ground engaging means supporting said side frames adjacent to the rotary cutter, of a gear member connected with one of the ground wheels, a gear member connected with a rotary cutter, connecting gearing comprising a gear meshing with one of said gear members, and a laterally movable gear meshing with the other of said gear members, clutch mechanism for connecting said intermediate gears, and shifting mechanism operatively connected with the movable gear for shifting it into and out of operative relation with the other intermediate gear.

In testimony whereof I affix my signature.

WILLIAM H. COLDWELL.

Copies of this patent may be obtained for five cents each, by addressing the "Commissioner of Patents, Washington, D. C."